(12) United States Patent
Fulton et al.

(10) Patent No.: US 12,209,768 B2
(45) Date of Patent: Jan. 28, 2025

(54) SYSTEMS AND METHODS FOR EVAPORATIVE COOLING CONTROL

(71) Applicant: Western Mechanical Solutions, LLC, Denver, CO (US)

(72) Inventors: Michael K. Fulton, Lakewood, CO (US); Hal Douglas Yoder, II, Lakewood, CO (US); Enrico J. Ressler, Slatington, PA (US)

(73) Assignee: WESTERN MECHANICAL SOLUTIONS, LLC, Denver, CO (US)

( * ) Notice: Subject to any disclaimer, the term of this patent is extended or adjusted under 35 U.S.C. 154(b) by 0 days.

(21) Appl. No.: 16/023,932

(22) Filed: Jun. 29, 2018

(65) Prior Publication Data
US 2020/0003436 A1  Jan. 2, 2020

(51) Int. Cl.
*F24F 5/00* (2006.01)
*F24F 11/30* (2018.01)
*F24F 1/0007* (2019.01)
*F24F 110/10* (2018.01)
*F24F 110/20* (2018.01)

(52) U.S. Cl.
CPC ............ *F24F 5/0035* (2013.01); *F24F 11/30* (2018.01); *F24F 1/0007* (2013.01); *F24F 2110/10* (2018.01); *F24F 2110/20* (2018.01)

(58) Field of Classification Search
CPC ...... F24F 5/0035; F24F 11/30; F24F 2110/10; F24F 2110/20; F24F 2001/0088
See application file for complete search history.

(56) References Cited

U.S. PATENT DOCUMENTS

| | | | |
|---|---|---|---|
| 2,282,210 A * | 5/1942 | Plum | F24F 3/06 165/219 |
| 4,103,508 A * | 8/1978 | Apple | F24F 3/14 62/92 |
| 4,932,218 A | 6/1990 | Robbins | |
| 9,140,460 B2 | 9/2015 | Woods et al. | |
| 9,500,384 B2 | 11/2016 | McFarland | |
| 9,612,026 B2 | 4/2017 | Mothfar | |
| 2010/0154448 A1* | 6/2010 | Hay | G06F 1/20 62/175 |
| 2014/0190198 A1* | 7/2014 | Slessman | H05K 7/20745 62/314 |

(Continued)

*Primary Examiner* — Larry L Furdge
(74) *Attorney, Agent, or Firm* — Sheridan Ross P.C.

(57) ABSTRACT

Implementations described and claimed herein provide systems and methods for evaporative cooling control. In one implementation, a humidity setpoint is received for a designated space, and at least one atmospheric condition of ambient air is received. The at least one atmospheric condition is measured using one or more ambient air sensors. A performance prediction of an evaporative cooler is generated by calculating a set of one or more predicted psychrometric properties of supply air leaving the evaporative cooler based on the at least one atmospheric condition. The humidity setpoint is compared to the set of one or more predicted psychrometric properties of the performance prediction in a setpoint comparison. A flow of fluid is controlled over evaporative media using one or more pumps of the evaporative cooler. The flow of the fluid is controlled based on the setpoint comparison such that the humidity setpoint is prevented from being exceeded.

8 Claims, 7 Drawing Sheets

(56) References Cited

U.S. PATENT DOCUMENTS

| | | | |
|---|---|---|---|
| 2015/0204553 A1* | 7/2015 | Kirkwold | B01F 3/04078 |
| | | | 62/121 |
| 2015/0241077 A1* | 8/2015 | Ogawa | F24F 11/30 |
| | | | 700/276 |
| 2016/0069577 A1* | 3/2016 | Dinnage | F28D 5/00 |
| | | | 62/333 |
| 2016/0116194 A1* | 4/2016 | Townsend | F24F 5/0035 |
| | | | 62/157 |
| 2017/0097166 A1 | 4/2017 | Morris | |

* cited by examiner

SYSTEMS AND METHODS FOR EVAPORATIVE COOLING CONTROL

FIELD

Aspects of the present disclosure relate generally to evaporative cooling control and more particularly to performance prediction and corresponding control of an evaporative cooler to prevent temperature and/or humidity setpoints from being exceeded for a designated space.

BACKGROUND

Evaporative coolers are desirable in dry climates by supplying cooled and humid air to a designated space, such as a building or house. Conventional evaporative coolers, however, are plagued by inefficiencies, unresponsiveness, resource waste, and unsatisfactory performance, among other problems. For example, many conventional evaporative coolers produce large temperature swings and periods of high humidity, rendering the designated space uncomfortable for occupants. Generally, water is spread across evaporative media, which adds humidity and cools incoming air through evaporation. The response time for producing cooled, humid air using conventional evaporative coolers is quite slow, often taking many minutes for the evaporative media to become fully wet and thus the evaporative cooler operational. Further, if the designated space becomes too humid, some conventional evaporative coolers automatically shut off. However, due to the slow response time, many evaporative coolers will continue outputting humid air for up to an hour after being commanded to shut down until the evaporative media is dry. As a result of these slow response times, conventional evaporative coolers often undershoot or overshoot the temperature and humidity levels desired for occupant comfort.

Exacerbating these problems with responsiveness to interior conditions in the designated space, outside atmospheric conditions often change, sometimes dramatically in a short period of time. With many conventional evaporative coolers operating on a closed feedback loop and suffering from slow response times, the evaporative coolers are unable to adjust effectively to changing outside conditions without impacting occupant comfort. For example, changing outside conditions may diminish the cooling effect of the evaporative cooler, increase the time for the evaporative media to dry, increase the humidity beyond a comfort level, and/or the like. Some conventional systems utilize mechanical cooling to supplement the evaporative cooler, including removing excess moisture from the air. However, such an approach is inefficient and wastes resources, including water and energy.

It is with these observations in mind, among others, that various aspects of the present disclosure were conceived and developed.

SUMMARY

Implementations described and claimed herein address the foregoing problems by providing systems and methods for evaporative cooling control. In one implementation, a humidity setpoint is received for a designated space, and at least one atmospheric condition of ambient air is received. The at least one atmospheric condition is measured using one or more ambient air sensors. A performance prediction of an evaporative cooler is generated by calculating a set of one or more predicted psychrometric properties of supply air leaving the evaporative cooler based on the at least one atmospheric condition. The evaporative cooler has evaporative media and one or more pumps. The humidity setpoint is compared to the set of one or more predicted psychrometric properties of the performance prediction in a setpoint comparison. A flow of fluid is controlled over the evaporative media using the one or more pumps. The flow of the fluid is controlled based on the setpoint comparison such that the humidity setpoint is prevented from being exceeded.

In another implementation, at least one atmospheric setpoint is received for a designated space, and at least one atmospheric condition of ambient air is received. The at least one atmospheric condition is measured using one or more ambient air sensors. A performance prediction of an evaporative cooler is generated by calculating a set of one or more predicted psychrometric properties of supply air leaving the evaporative cooler based on the at least one atmospheric condition. The evaporative cooler has evaporative media and one or more pumps. The at least one atmospheric setpoint is compared to the set of one or more predicted psychrometric properties of the performance prediction in a setpoint comparison. A flow of fluid is controlled over the evaporative media by modulating the one or more pumps based on the setpoint comparison.

In yet another implementation, a humidity setpoint and a temperature setpoint are received for a designated space, and at least one atmospheric condition of ambient air is received. The at least one atmospheric condition is measured using one or more ambient air sensors. A performance prediction of an evaporative cooler is generated by calculating a set of one or more predicted psychrometric properties of supply air leaving the evaporative cooler based on the at least one atmospheric condition. The humidity setpoint is compared to the set of one or more predicted psychrometric properties of the performance prediction in a setpoint comparison. An energy of the supply air is compared to an energy of return air in an energy comparison when the setpoint comparison indicates that the humidity setpoint will be exceeded. At least one of the evaporative cooler or a mechanical cooling unit is controlled based on the setpoint comparison and the energy comparison.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Aspects of the presently disclosed technology relate to systems and methods for evaporative cooling control. Generally, a cooling system includes a cooling unit having an evaporative cooler providing fine control of leaving air temperature and humidity directed into a designated space, such as a house, building, and/or the like. Dynamic control of evaporative cooling is achieved through performance prediction to provide optimized comfort of occupants in the designated space. The optimized comfort may include preventing temperature and/or humidity setpoints from being exceeded through the performance prediction. By predicting performance of the evaporative cooler, a flow of water is controlled over evaporative media, controlling temperature and humidity for the designated space instantaneously, without the typical overshooting and slow response times associated with conventional systems.

In one aspect, one or more direct digital controls (DDC) determine atmospheric conditions of ambient air and the space air, outside and within the designated space, respectively, using one or more sensors. Based on the atmospheric conditions, a predicted performance of the evaporative cooler is generated, including a calculation of psychrometric properties of each condition. The psychrometric properties may include, without limitation, dewpoint, humidity ratio, enthalpy, wetbulb temperature, and the like. These values are compared to atmospheric setpoints for the designated space, including a humidity setpoint and/or a temperature setpoint. Based on the comparison, waterflow is precisely controlled using a flow control device to prevent the atmospheric setpoints from being exceeded. In some aspects, the evaporative cooler may supplement a mechanical cooling unit to reduce power consumption during cooling.

As such, the presently disclosed technology provides many benefits and improvements over conventional systems, including, but not limited to, fine control of temperature and humidity levels, dynamic adjustment to changing inside and/or outside atmospheric conditions, rapid response times, resource conservation, and optimized occupant comfort. These advantages, among others, will be apparent from the present disclosure to those skilled in the art.

Figure 1:
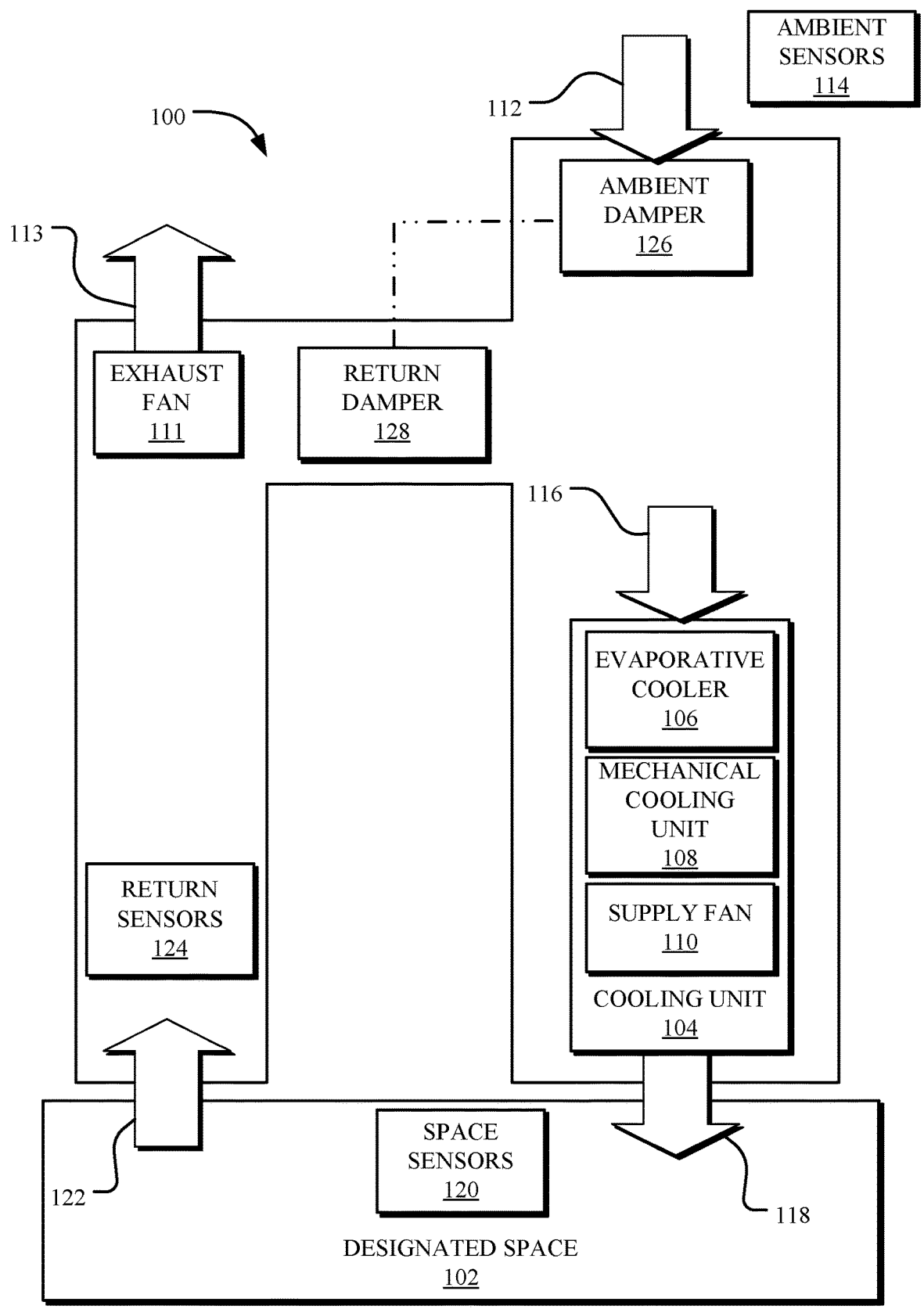
FIG. 1 is a block diagram illustrating an example cooling system for a designated space.

To begin a detailed description of an example cooling system 100 for a designated space 102, reference is made to FIG. 1. In one implementation, the cooling system 100 includes a cooling unit 104 having an evaporative cooler 106. The cooling unit 104 may further include a mechanical cooling unit 108, which may be various types of heating, ventilation, and air conditioning (HVAC) systems. The evaporative cooler 106 may cooperate with the mechanical cooling unit 108 to reduce resource consumption, including water and power, and optimize occupant comfort in the designated space 102.

In one implementation, ambient air 112 from outside the designated space 102 is drawn into the cooling system 100 through an intake. An ambient damper 126 controls a flow of the ambient air 112 into the cooling system 100. Intake air 116 is directed into the cooling unit 104, where the evaporative cooler 106 and the mechanical cooling unit 108 cooperate to provide supply air at a designated temperature and humidity level. A supply fan 110 controls an airflow of the supply air and outputs leaving air 118 from the cooling unit 104 into the designated space 102. Return air 122 is directed from the designated space 102 into the cooling system 100 where a return damper 128, in coordination with the ambient damper 126, controls a mixing of the return air 122 with the ambient air 112 to provide the intake air 116, as described in more detail herein. An exhaust fan 111 directs the return air 122 towards the return damper 128 or outputs the return air 122 as exhaust air 113.

Using data captured by various sensors, such as one or more ambient sensors 114, one or more space sensors 120, and one or more return sensors 124, a predicted performance of the evaporative cooler 106 is generated. The operation of the evaporative cooler 106 is finely controlled based on the predicted performance to optimize occupant comfort and dynamically respond to changing atmospheric conditions within and outside of the designated space 102. In one implementation, the predicted performance is used to control the evaporative cooler 106 to prevent a humidity setpoint and/or a temperature setpoint for the designated space 102 from being exceeded. Further, operation of the evaporative cooler 106 may be controlled in coordination with the mechanical cooling unit 108 based on the predicted performance to conserve resources, such as water and energy, as well as to increase efficiency of the cooling unit 104. Generally, the cooling unit 104 anticipates future atmospheric conditions of the designated space 102, including humidity and temperature, by predicting an impact of the evaporative cooler 106 on the designated space 102 and controls the operation of the evaporative cooler 106 and/or the mechanical cooling unit 108 accordingly, to ensure designated temperature and humidity levels are achieved efficiently.

Figure 2:
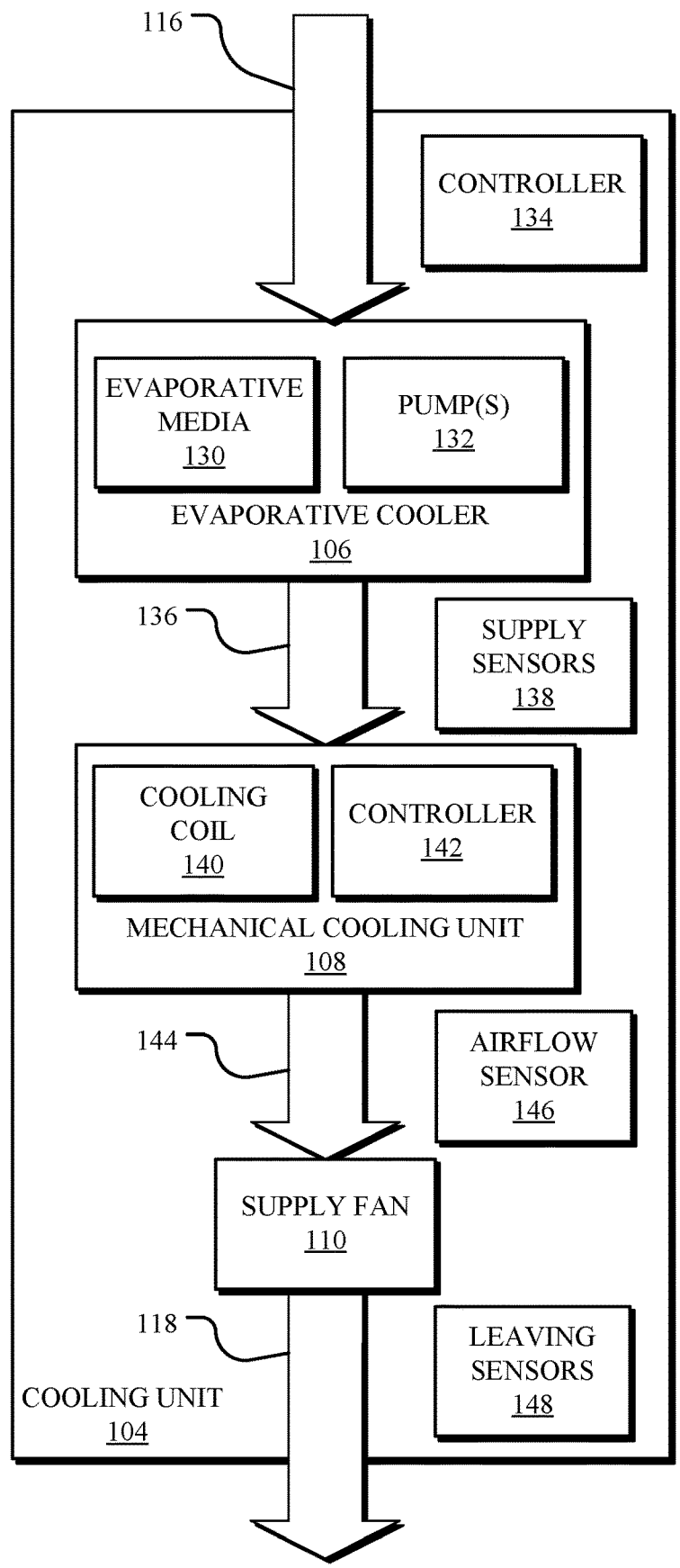
FIG. 2 is a block diagram illustrating an example cooling unit of the cooling system.

Referring to FIGS. 1 and 2, in one implementation, the evaporative cooler 106 includes evaporative media 130, one or more pumps 132. The pumps 132 direct fluid, such as water, to the evaporative media 130, which is wetted with the fluid. The intake air 116 is induced into the evaporative cooler 106 and drawn across the evaporative media 130. As the fluid evaporates from the evaporative media 130, a low pressure steam is formed with humidity added to the intake air 116. Further, energy is traded between the intake air 116 and the fluid, such that the fluid absorbs heat from the intake air 116, thereby cooling the intake air 116. Stated differently, the energy used to evaporate the fluid from the evaporative media 130 cools the intake air 116, and the evaporated fluid adds moisture to the intake air 116. The cooled, humid air is output from the evaporative cooler 106 as supply air 136.

A controller 134 controls an operation of the cooling unit 104, including the evaporative cooler 106, the mechanical cooling unit 108, and/or other components. The controller 134 may be part of or separate from each of these components and may include one or more computing units. In one implementation, the controller 134 generates the performance prediction of the evaporative cooler 106 and precisely controls the flow of fluid over the evaporative media 130 via the pumps 132 to achieve one or more designated atmospheric conditions, such as temperature, humidity (e.g., humidity ratio, dewpoint, anticipated relative humidity of the designated space 102 based on occupant load, etc.), and/or the like, for the designated space 102. The designated atmospheric conditions may be set by the occupants of the designated space 102 according to comfort levels, by an administrator of the cooling system 100 to achieve a balance of efficiency, resource conservation, and comfort, and/or by other users according to various preferences or parameters.

The controller 134 may determine whether to enable the evaporative cooler 106 based on one or more thresholds. The thresholds may include, without limitation: whether the designated atmospheric conditions are achievable with the evaporative cooler 106 by adjusting the flow of fluid across the evaporative media 130 between a minimum flow and a maximum flow; whether evaporative cooling is more efficient than using mechanically cooled air; and when evaporative cooling cannot meet the load, whether adding mechanical cooling will meet the load. In one implementation, if each of the thresholds is not met, the evaporative cooler 106 is not powered on, conserving water and decreasing response time for achieving the designated atmospheric conditions.

During cooling season (e.g., in warmer and/or drier time periods), there are many instances where a partial operation of the evaporative cooler 106 would meet the designated atmospheric conditions and maintain a conservation of resources, such as water and energy. For example, the pumps 132 may be modulated to control a flow of fluid over the evaporative media 130 by pulsing the pumps 132 between an on and off status, controlling a pump speed of the pumps 132, modulating a valve to vary water flow across the media as well as the resulting evaporation, and/or the like.

Conventional systems combining evaporative and mechanical cooling often significantly waste resources. For example, conventional evaporative coolers often produce humid air outside a designated temperature range and conventional mechanical cooling then removes the excess humidity from the air and adjust the temperature, thereby wasting water and energy. An apparent benefit of the presently disclosed technology over such conventional systems is efficiency and resource conservation. More particularly, a partial operation or a full operation of the evaporative cooler 106 with the predictive control described herein in conjunction with the mechanical cooling unit 108 drastically reduces the mechanical cooling needed to cool the designated space 102. In one implementation, evaporatively cooled air (e.g., the supply air 136) that has a cooler temperature or energy use than a temperature or energy use of the return air 122, results in less mechanical cooling required and significant resource conservation, all while preventing the designated space 102 from becoming over humidified and thus uncomfortable.

Operation of the evaporative cooler 106 based on such a comparative energy analysis in combination with the humidity setpoint and/or temperature setpoint control, provides fine control of temperature and humidity levels, dynamic adjustment to changing inside and/or outside atmospheric conditions, rapid response times, resource conservation, and optimized occupant comfort, among other benefits. The presently disclosed technology provides a measurable improvement over conventional systems where unit performance is solely based on a temperature and humidity of air entering the unit, with no limits or finite control of leaving temperature or humidity.

As shown in FIG. 2, in one implementation, the cooling unit 104 includes the evaporative cooler 106 and the mechanical cooling unit 108. The evaporative cooler 106 receives the intake air 116 and when operational, cools and adds humidity to the intake air 116, which is then output as the supply air 136. When the evaporative cooler 106 is not operational, the intake air 116 simply passes through the evaporative cooler 106 or is otherwise directed to the mechanical cooling unit 108 as the supply air 136. When operational, the mechanical cooling unit 108 provides mechanical cooling of the supply air 136 through a compressor controller 142 and coiling coil 140 and outputs cooled air 144. When not operational, the supply air 136 simply passes through the mechanical cooling unit 108 or is otherwise directed to the supply fan 110 as the cooled air 144. The supply fan 110 directs the cooled air 144 for output from the cooling unit 104 as the leaving air 118. It will be appreciated that other configurations of the cooling unit 104 are contemplated and such a configuration is exemplary only. For example, the evaporative cooler 106 may be disposed upstream or downstream from the mechanical cooling unit 108, among other variations.

In one implementation, a humidity setpoint and/or a temperature setpoint for the designated space 102 are received at the cooling unit 104, for example, at the controller 134 of the evaporative cooler 106. The setpoints may be captured via a user interface displayed with device interface or a user device associated with an occupant, an administrator, and/or other authorized personnel, and communicated to the controller 134. The humidity setpoint may include sub-setpoints, including, but not limited to, enthalpy, wetbulb, dewpoint, humidity ratio, and/or the like.

The ambient sensors 114 measure one or more atmospheric conditions of the ambient air 112 and communicate the same to the controller 134. The atmospheric conditions may include, without limitation, a temperature, a relative humidity, an airflow rate, and/or other conditions of the ambient air 112. The controller 134 may compare an area of the evaporative media 130 to the airflow rate of the ambient air 112 to more precisely determine media efficiency of the evaporative media 130.

Using the measured atmospheric conditions of the ambient air 112, the controller 134 generates a performance prediction of the evaporative cooler 106. In one implementation, the controller 134 calculates a set of one or more predicted psychrometric properties of the supply air 136 leaving the evaporative cooler 106. Stated differently, the controller anticipates what the psychrometric properties of the supply air 136 will be based on the atmospheric conditions of the ambient air 116, among other factors. The predicted psychrometric properties of the supply air 136 may include, without limitation, temperature, enthalpy, wetbulb, dewpoint, humidity ratio, and/or the like.

In one implementation, the controller 134 performs a setpoint comparison by comparing the humidity setpoint, including any humidity sub-setpoints, and/or the temperature setpoint to the predicted psychrometric properties of the supply air 136. The setpoint comparison based on dewpoint or humidity ratio in particular may provide an optimized and increased accuracy prediction of occupant comfort. Based on the comparison, the evaporative cooler 106 is controlled to the humidity setpoint and/or the temperature setpoint. For example, a waterflow over the evaporative media 130 may be controlled by the pumps 132 or other flow control device according to the setpoint comparison. In one implementation, the waterflow is controlled by staging, speed controlling, pulsing, bypassing, and/or otherwise modulating the pumps 132. The performance prediction of the evaporative cooler 106 may be validated by measuring actual psychrometric properties of the supply air 136 leaving the evaporative cooler 106 using one or more supply air sensors 138 and comparing the corresponding values to the predicted psychrometric properties. An operation of the evaporative cooler 106 may be dynamically adjusted and/or flagged for analysis by an administrator where the validation indicates a discrepancy between the performance prediction and actual performance.

In one implementation, if the setpoint comparison indicates that the temperature setpoint can be maintained without exceeding the humidity setpoint, the cooling for the designated space 102 is provided solely through the evaporative cooler 106. The pumps 132 may be staged, speed controlled, bypassed, pulsed, and/or otherwise modulated to maintain the temperature setpoint. However, if the setpoint comparison indicates that the humidity setpoint will be exceeded, the humidity becomes a high limit and limits the cooling through the evaporative cooler 106. In one implementation, the humidity thus becomes the controlling value with the supply air 136 being compared to the return air 122 in an energy comparison.

If this energy comparison indicates that the supply air 136 uses less energy than the return air 122, the mechanical cooling unit 108 may be modulated using the compressor controller 142 to meet the humidity setpoint and a temperature setpoint for the leaving air 118. If the energy comparison indicates that the supply air 136 is not less energy intensive than the return air 122, the ambient damper 126 may be closed to a minimum ventilation setpoint, the return damper 128 opened, and the mechanical cooling unit 108 may be modulated using the compressor controller 142 to maintain the temperature setpoint of the leaving air 118.

One or more airflow sensors 146 may measure an airflow rate of the cooled air 144. In one implementation, energy use is further optimized by comparing an actual airflow measured using the airflow sensors 146 to a maximum available airflow. Because evaporative cooling is significantly more efficient than mechanical cooling, the temperature setpoint may be increased if the humidity setpoint, such as the dewpoint and/or humidity ratio sub-setpoints, are not exceeded. The temperature setpoint of the supply air 136 may be increased until the supply fan 110 is at a maximum airflow, such as 100%, as measured by the airflow sensors 146.

One or more leaving sensors 148 may measure various properties of the leaving air 118, and the one or more space sensors 120 may measure the atmospheric conditions of the designated space 102. In one implementation, a performance of the cooling unit 104 is dynamically adjusted based on the values measured by the sensors 148 and/or 120. For example, adjustments for space humidity generation may be accommodated by measuring space relative humidity, and if it is above a space humidity setpoint, the humidity setpoint for the supply air 136, such as the dewpoint and/or humidity ratio sub-setpoints, may be lowered to lower the space relative humidity of the designated space 102.

Further, in one implementation, to prevent the compressors of the mechanical cooling unit 108 from rapid cycling, when a compressor comes on, the temperature setpoint of the supply air 136 is increased to a minimum capacity of the compressor at the temperature and capacity provided by the compressor to maintain the leaving air temperature setpoint of the leaving air 118.

In one implementation, the controller 134 stages the pumps 132 to maintain the temperature setpoint of the supply air 136. In the event that the performance prediction indicates that the evaporative cooler 106 cannot satisfy the temperature setpoint, direct expansion cooling air conditioning is enabled. While direct expansion cooling air conditioning is enabled, the pumps 132 are staged to maintain maximum energy savings, as described herein. For example, maximum energy savings are obtained by controlling the evaporative cooler 106 to a lowest temperature possible of the supply air 136 with a dewpoint equal to or lower than a designated temperature leaving dewpoint of the cooling coil 140.

To cool the designated space 102, in one example implementation, the cooling unit 104 is set such that the supply fan 110 is running and cooling mode is enabled. The efficiency of the evaporative media 130 is calculated, which represents an amount of moisture the evaporative media 130 can evaporative into the intake air 116. Using the calculated efficiency of the evaporative media 130 along with the one or more atmospheric conditions of the ambient air 112, the performance prediction is generated by calculating the one or more predicted psychrometric properties of the supply air 136 for each stage. For example, the leaving air dry bulb and dewpoint may be calculated for each stage.

In one implementation, the leaving dewpoint is calculated at the supply dry bulb set point. A difference of dry bulb setpoint and calculated leaving air temperature of a first stage is multiplied by a difference of a calculated dewpoint of a last stage and a calculated dewpoint of the first stage. This value is divided by a difference of a leaving air temperature of the last stage and the calculated leaving air temperature of the first stage, and the resulting value is added to the calculated dewpoint of the first stage. The calculated leaving dewpoint at the dry bulb setpoint is compared to the dewpoint sub-setpoint, dry bulb setpoint, and the calculated leaving air temperature of the last stage to predict the leaving air conditions of the supply air 136.

If the calculated leaving dewpoint at the dry bulb setpoint is below the dewpoint sub-setpoint and the calculated leaving air temperature at the last stage is below the dry bulb setpoint, then the evaporative cooling is not limited to dewpoint, the calculated leaving air temperature is predicted as the dry bulb setpoint, and the calculated leaving dewpoint is predicted as the calculated leaving dewpoint at the dry bulb setpoint. If the calculated leaving dewpoint at the dry bulb setpoint is below the dewpoint sub-setpoint and the calculated leaving air temperature at the last stage is above the dry bulb setpoint, then the evaporative cooling is not limited to dewpoint, the calculated leaving air temperature is predicted as the calculated leaving air temperature of the last stage, and the calculated leaving dewpoint at the calculated dewpoint of the last stage. Similarly, if the calculated leaving dewpoint at the dry bulb setpoint is above the dewpoint sub-setpoint, the calculated leaving air temperature at the last stage is above the dry bulb setpoint, and the calculated dewpoint of the last stage is below the dewpoint sub-setpoint, then the evaporative cooling is not limited to dewpoint, the calculated leaving air temperature is predicted as the calculated leaving air temperature of the last stage, and the calculated leaving dewpoint at the calculated dewpoint of the last stage. However, if the calculated leaving dewpoint at the dry bulb setpoint is above the dewpoint sub-setpoint and the calculated leaving air temperature at the last stage is above or below the dry bulb setpoint, then the evaporative cooling is limited to dewpoint, the calculated leaving air temperature is predicted as the dewpoint sub-setpoint.

In one implementation, the performance prediction includes a predicted capacity calculation and/or a predicted partial stage capacity calculation. The predicted capacity calculation involves the evaporative capacity needed to meet the dry bulb setpoint or otherwise maintain maximum energy savings. Similarly, the predicted partial stage capacity calculation involves the partial stage capacity needed to meet the dry bulb setpoint or otherwise maintain maximum energy savings. The predicted capacity calculation may be equal to one hundred times a difference of the outside dry bulb and a calculated leaving air temperature divided by a difference of the outside dry bulb and a calculated leaving air temperature of the last stage. The predicted partial stage capacity calculation may be equal to a difference of a predicted capacity and the product of a predicted number of full stages and a capacity of one stage.

A predicted number of full stages may correspond to a number of stages allowed to run to meet the dry bulb setpoint or otherwise maintain maximum energy savings. The calculated leaving air temperature and dewpoint for each stage is compared to the various setpoints/sub-setpoints. Saturation temperature of the fluid with adjustable differentials may be used to prevent short cycling. In one implementation, when each of the following conditions are true, the right number of stages will be enabled to run continuously: 1) the calculated leaving air temperature is greater than or equal to a difference of the supply air setpoint and the motor heat plus or minus a deadband; 2) the calculated leaving air temperature is less than the returning air temperature; and 3) the calculated dewpoint is less than or equal to a difference of the supply air setpoint and the motor heat.

In one implementation, partial stage control may be performed in conjunction with pump pulsing. If additional capacity is needed, the next stage modulates water flow to maintain supply air temperature for maximum energy savings. The modulation time may be adjusted from a minimum runtime to a maximum runtime using a proportional integral derivative (PID) output. The PID output may be the minimum value of temperature PID and dewpoint PID. If the PID output is below the minimum runtime, the stage will be off. If the PID output is above the maximum runtime, the stage will run continuously.

Figure 3:
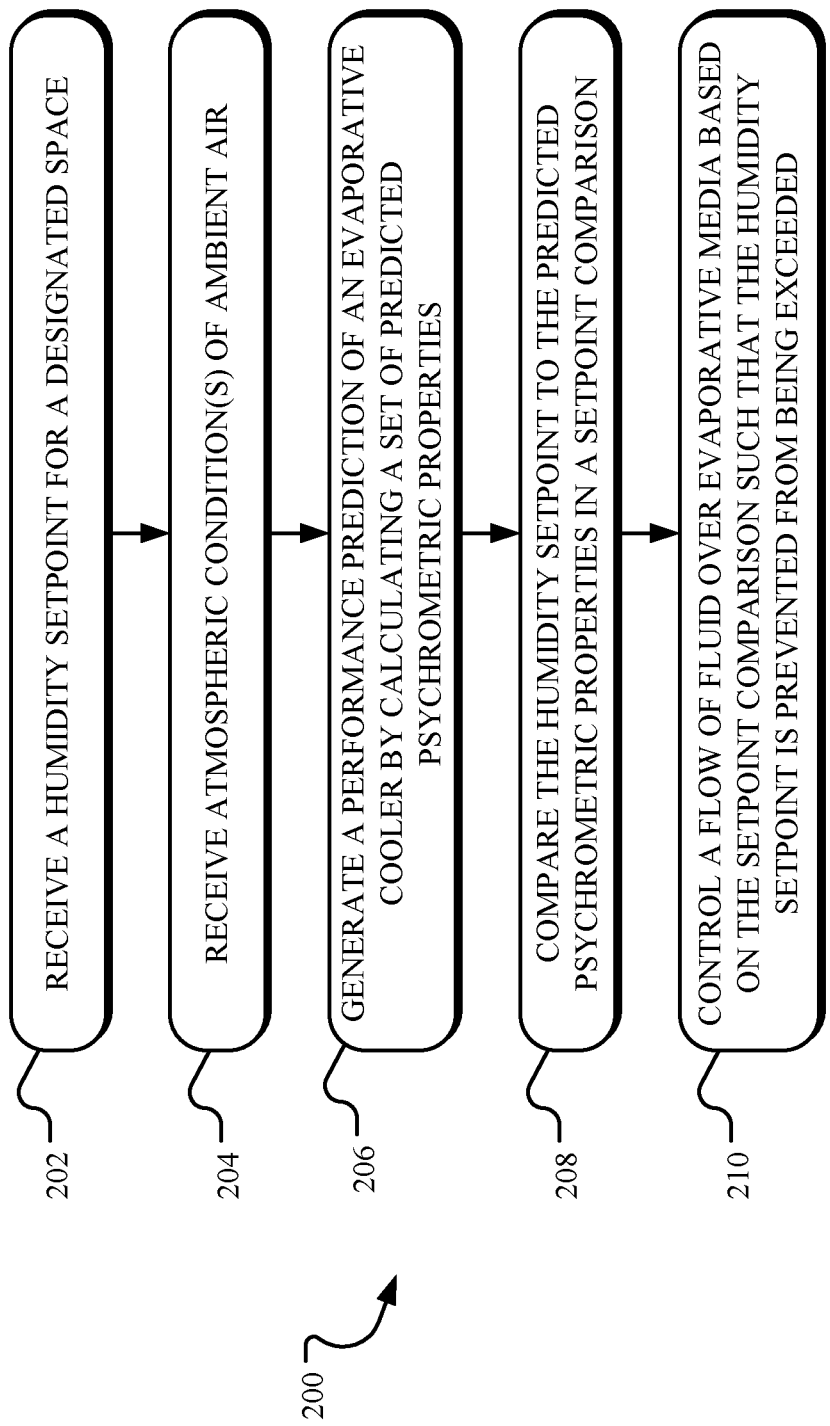
FIG. 3 illustrates example operations for evaporative cooling control.
Figure 4:
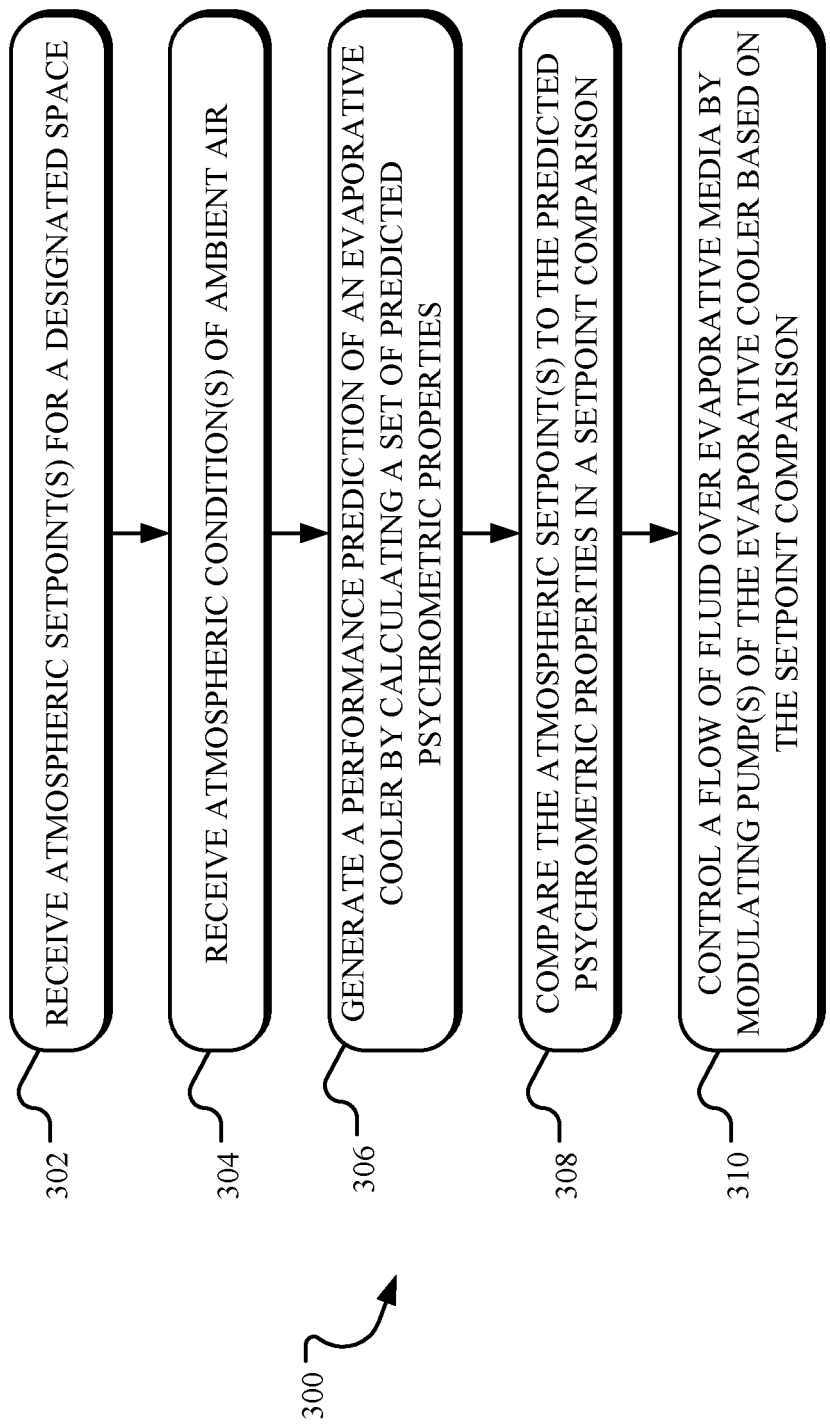
FIG. 4 illustrates another example of operations for evaporative cooling control.
Figure 5:
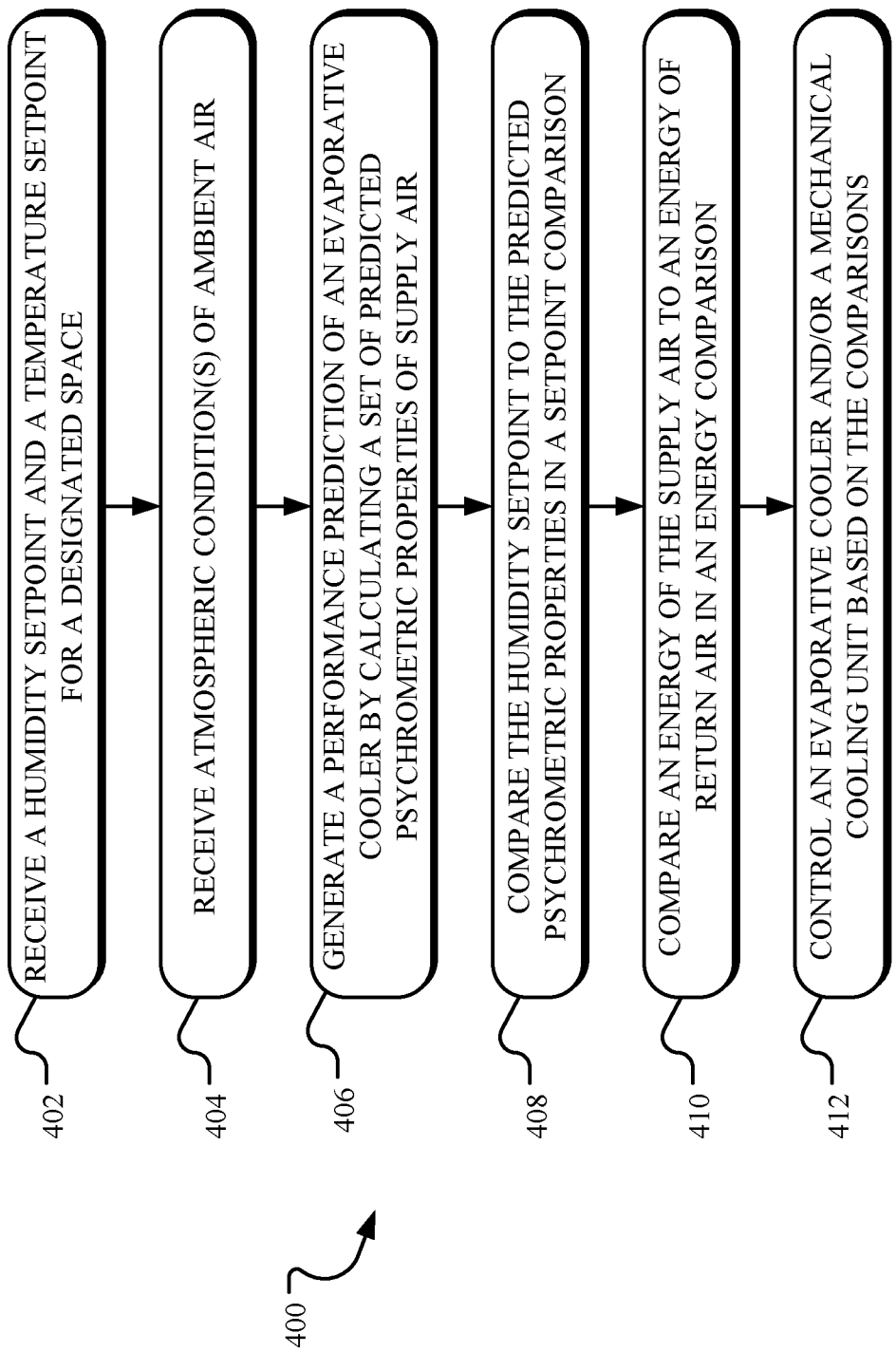
FIG. 5 illustrates yet another example of operations for evaporative cooling control.

Referring to FIGS. 3-5, example operations 200-400 for evaporative cooling control are provided. Turning first to FIG. 3, in one implementation, an operation 202 receives a humidity setpoint for a designated space. The humidity setpoint may include sub-setpoints, including, but not limited to, enthalpy, wetbulb, dewpoint, humidity ratio, relative humidity, absolute humidity, and/or the like. The operation 202 may receive the humidity setpoint from a device interface or a user device at a controller.

An operation 204 receives at least one atmospheric condition of ambient air. The atmospheric condition(s) may include one or more of a temperature, relative humidity, and/or airflow of ambient air. The operation 202 may receive the atmospheric condition(s) from one or more ambient air sensors at the controller.

An operation 206 generates a performance prediction of an evaporative cooler by calculating a set of one or more predicted psychrometric properties of supply air leaving the evaporative cooler based on the atmospheric condition(s). In one implementation, the evaporative cooler includes evaporative media and one or more pumps. An operation 208 compares the humidity setpoint to the set of one or more predicted psychrometric properties of the performance prediction in a setpoint comparison. In one implementation, the set of one or more predicted psychrometric properties of the performance prediction may be validated by measuring corresponding values of the supply air using one or more supply air sensors.

An operation 210 controls a flow of fluid, such as water, over the evaporative media using the one or more pumps. The operation 210 controls the flow of the fluid based on the setpoint comparison such that the humidity setpoint is prevented from being exceeded. In one implementation, the pumps are staged, speed controlled, pulsed, bypassed, and/or otherwise modulated to control the flow of fluid.

In one implementation, the supply air is compared to return air in an energy comparison when the setpoint comparison indicates that the humidity setpoint will be exceeded. Mechanical cooling may be modulated to meet the humidity setpoint and a leaving air temperature setpoint when the energy comparison indicates the supply air is less energy intensive than the return air. An outside air damper may be closed to a minimum ventilation setpoint, a return damper opened, and mechanical cooling may be modulated to meet a leaving temperature setpoint when the energy comparison indicates the supply air is not more energy efficient than the return air.

Referring to FIG. 4, in one implementation, an operation 302 receives at least one atmospheric setpoint for a designated space. The atmospheric setpoint(s) may include a humidity setpoint, a temperature setpoint, and/or the like. The humidity setpoint may include sub-setpoints, including, but not limited to, enthalpy, wetbulb, dewpoint, humidity ratio, relative humidity, absolute humidity, and/or the like. The operation 302 may receive the atmospheric setpoint(s) from a device interface or a user device at a controller.

An operation 304 receives at least one atmospheric condition of ambient air. The atmospheric condition(s) may include one or more of a temperature, relative humidity, and/or airflow of ambient air. The operation 302 may receive the atmospheric condition(s) from one or more ambient air sensors at the controller.

An operation 306 generates a performance prediction of an evaporative cooler by calculating a set of one or more predicted psychrometric properties of supply air leaving the evaporative cooler based on the atmospheric condition(s). In one implementation, the evaporative cooler includes evaporative media and one or more pumps. An operation 308 compares the atmospheric setpoint(s) to the set of one or more predicted psychrometric properties of the performance prediction in a setpoint comparison.

An operation 310 controls a flow of fluid, such as water, over the evaporative media by modulating the one or more pumps based on the setpoint comparison. In one implementation, the operation 310 modulates the one or more pumps by pulsing the one or more pumps according to a modulation time adjusted between a minimum runtime and a maximum runtime. In other implementations, the operation 310 modulates the one or more pumps by at least one of staging, speed control, pulsing, or bypassing. The operation 310 may control the flow of fluid to a lowest leaving air temperature having a dewpoint equal to a cooling coil leaving dewpoint.

Turning to FIG. 5, in one implementation, an operation 402 receives a humidity setpoint and a temperature setpoint for a designated space. The operation 402 may receive the temperature setpoint and the humidity setpoint from a device interface or a user device at a controller. An operation 404 receives at least one atmospheric condition of ambient air. The operation 402 may receive the atmospheric condition(s) from one or more ambient air sensors at the controller.

An operation 406 generates a performance prediction of an evaporative cooler by calculating a set of one or more predicted psychrometric properties of supply air leaving the evaporative cooler based on the atmospheric condition(s). An operation 408 compares the humidity setpoint to the set of one or more predicted psychrometric properties of the performance prediction in a setpoint comparison. An operation 410 compares an energy of the supply air to an energy of return air in an energy comparison when the setpoint comparison indicates that the humidity setpoint will be exceeded to determine which will provide the lowest energy usage.

An operation 412 controls at least one of the evaporative cooler or a mechanical cooling unit based on the setpoint comparison and the energy comparison. In one implementation, the operation 412 controls the evaporative cooler and the mechanical cooling unit, such that the evaporative cooler exclusively provides cooling output when the setpoint comparison indicates that the temperature setpoint is maintainable without exceeding the humidity setpoint. The evaporative cooler may provide cooling output through a control of a flow of fluid over an evaporative media. The operation 412 may further control the evaporative cooler and the mechanical cooling unit, such that the mechanical cooling unit is modulated to meet the humidity setpoint and a leaving air temperature setpoint when the energy comparison indicates the supply air is more efficient than the return air. Finally, the operation 412 may further control the evaporative cooler and the mechanical cooling unit, such that an outside air damper is closed to a minimum ventilation setpoint and the mechanical cooling unit is modulated to meet a leaving temperature setpoint when the energy comparison indicates the supply air is not more efficient than the return air.

The cooling system 100 may be operated manually on-site, using for example, a device interface, such as a touchscreen or other input device. Alternatively or additionally, the cooling system 100 may be controlled or operated remotely by an administrator and/or one or more occupants.

Figure 6:
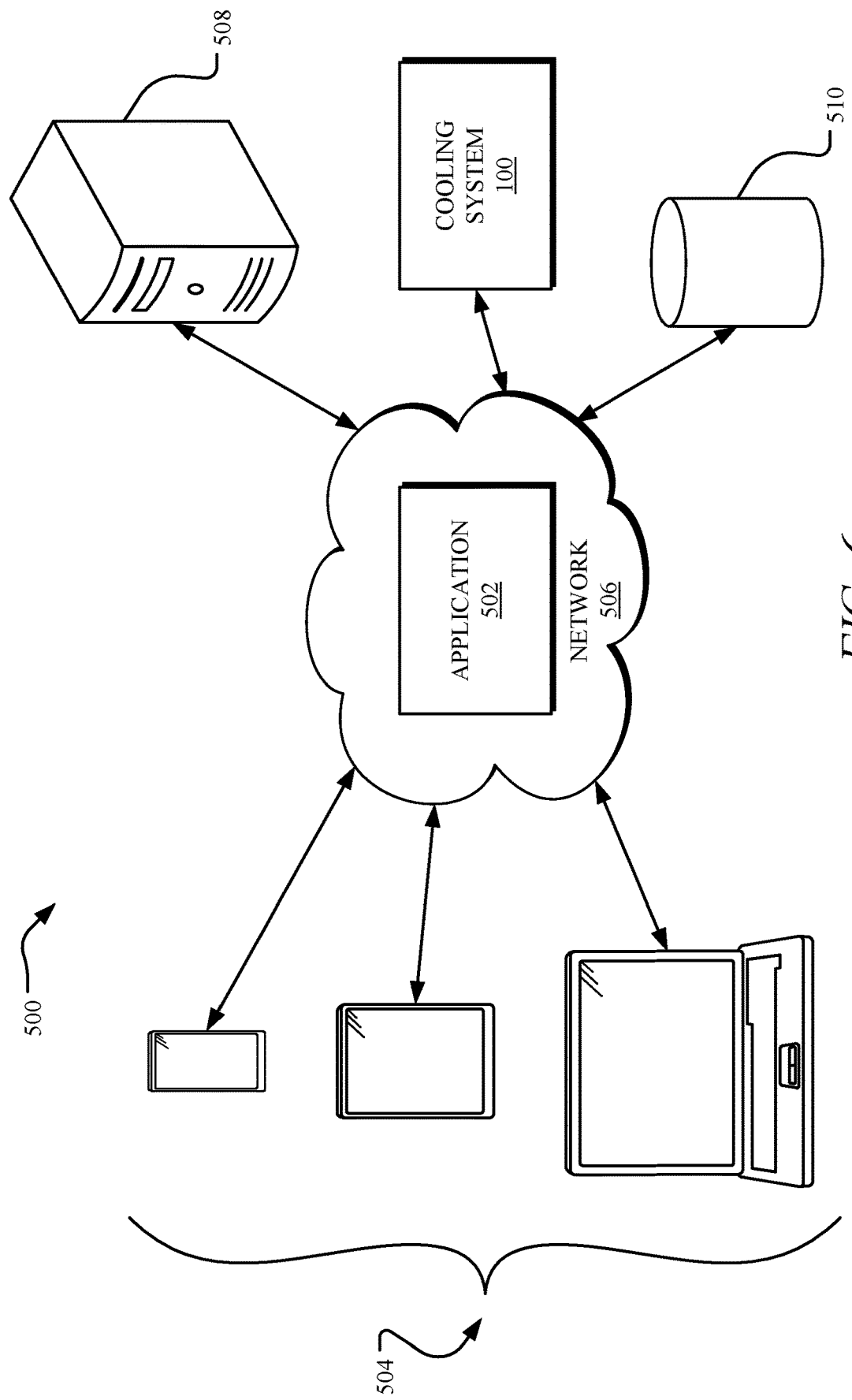
FIG. 6 depicts an example network environment for controlling one or more cooling systems.

Accordingly, FIG. 6 illustrates an example network environment 500 that may be useful in implementing a system and methods for remotely controlling one or more cooling systems 100 via a cooling controller application 502. As depicted in FIG. 6, a communications network 506 (e.g., the Internet) is used by one or more computing or data storage devices for implementing the system 500 for remotely monitoring, managing, and controlling the cooling systems 100. In one implementation, the cooling systems 100 and one or more user devices 504 are communicatively connected to the communications network 506. Examples of the user devices 504 include a personal computer, a lap top, a smart-phone, a tablet, a multimedia console, a gaming console, a set top box, a workstation, a terminal, and/or the like. A user may access the application 502 using the user devices 504. Users may include, for example: an owner and user of one or more cooling systems 100 at the same or different locations; an administrator of a cooling system service that monitors and manages one or more cooling systems 100 for one or more clients; and clients of such cooling services.

A server 508 hosts the system 500. In one implementation, the server 508 also hosts a website or the application 502 that users visit to access the system 500. The server 508 may be one single server, a plurality of servers with each such server being a physical server or a virtual machine, or a collection of both physical servers and virtual machines. In another implementation, a cloud hosts one or more components of the system 500. The cooling systems 100, the user devices 504, the server 508, and other resources connected to the communications network 506 may access one or more other servers for access to one or more websites, applications, web services interfaces, databases 510, and/or the like that are used to remotely monitor and manage the cooling systems 100. In one implementation, the server 508 also hosts a search engine that the system 500 uses for accessing and modifying information used to remotely monitor, control, and manage the cooling systems 100.

In one implementation, one or more of the operations 200, 300, and/or 400 are performed partially or fully by the application 502 over the communications network 500. Additionally, operational status information of, performance analytics for, resource savings by, alerts for, and other information pertaining to the cooling system(s) 100 may be captured and presented by the application 502. In some implementations, the cooling systems 100 are automatically dynamically adjusted and in others the cooling systems 100 may be adjusted or otherwise controlled remotely via the application 502. The user may further schedule maintenance calls, communicate with other authorized users (e.g., communications between an occupant and an administrator), and/or request other service.

Figure 7:
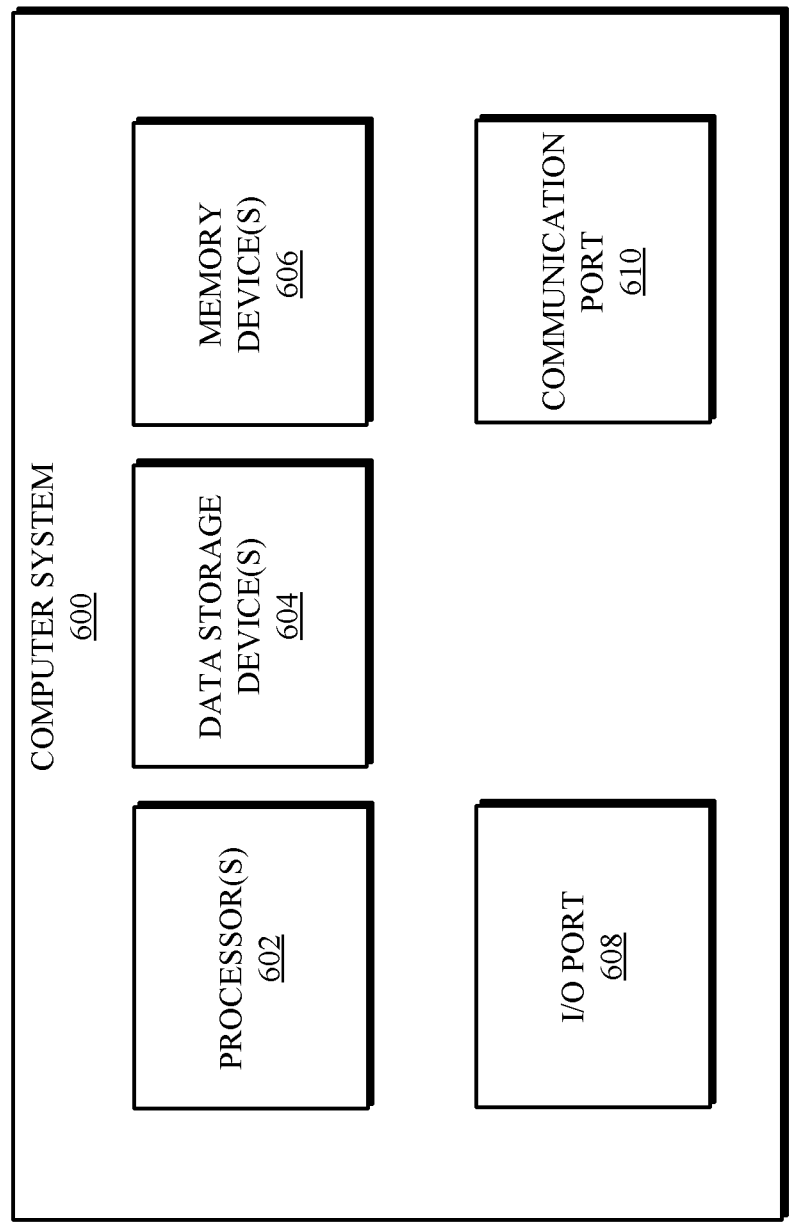
FIG. 7 shows an example computing system that may implement various systems and methods of the presently disclosed technology.

Referring to FIG. 7, a detailed description of an example computing system 600 having one or more computing units that may implement various systems and methods discussed herein is provided. The computing system 600 may be applicable to the controller 134, the compressor controller 142, and other computing units of the evaporative cooler 106, the mechanical cooling unit 108, the cooling unit 104, the cooling system 100, and other computing or network devices. It will be appreciated that specific implementations of these devices may be of differing possible specific computing architectures not all of which are specifically discussed herein but will be understood by those of ordinary skill in the art.

The computer system 600 may be a computing system capable of executing a computer program product to execute a computer process. Data and program files may be input to the computer system 600, which reads the files and executes the programs therein. Some of the elements of the computer system 600 are shown in FIG. 7, including one or more hardware processors 602, one or more data storage devices 604, one or more memory devices 606, and/or one or more ports 608-610. Additionally, other elements that will be recognized by those skilled in the art may be included in the computing system 600 but are not explicitly depicted in FIG. 7 or discussed further herein. Various elements of the computer system 600 may communicate with one another by way of one or more communication buses, point-to-point communication paths, or other communication means not explicitly depicted in FIG. 7.

The processor 602 may include, for example, a central processing unit (CPU), a microprocessor, a microcontroller, a digital signal processor (DSP), and/or one or more internal levels of cache. There may be one or more processors 602, such that the processor 602 comprises a single central-processing unit, or a plurality of processing units capable of executing instructions and performing operations in parallel with each other, commonly referred to as a parallel processing environment.

The computer system 600 may be a conventional computer, a distributed computer, or any other type of computer, such as one or more external computers made available via a cloud computing architecture. The presently described technology is optionally implemented in software stored on the data stored device(s) 604, stored on the memory device(s) 606, and/or communicated via one or more of the ports 608-610, thereby transforming the computer system 600 in FIG. 7 to a special purpose machine for implementing the operations described herein. Examples of the computer system 600 include personal computers, terminals, workstations, mobile phones, tablets, laptops, personal computers, multimedia consoles, gaming consoles, set top boxes, and the like.

The one or more data storage devices 604 may include any non-volatile data storage device capable of storing data generated or employed within the computing system 600, such as computer executable instructions for performing a computer process, which may include instructions of both application programs and an operating system (OS) that manages the various components of the computing system 600. The data storage devices 604 may include, without limitation, magnetic disk drives, optical disk drives, solid state drives (SSDs), flash drives, and the like. The data storage devices 604 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 604 and/or the memory devices 606, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 600 includes one or more ports, such as an input/output (I/O) port 608 and a communication port 610, for communicating with other computing, network, or vehicle devices. It will be appreciated that the ports 608-1310 may be combined or separate and that more or fewer ports may be included in the computer system 600.

The I/O port 608 may be connected to an I/O device, or other device, by which information is input to or output from the computing system 600. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 600 via the I/O port 608. Similarly, the output devices may convert electrical signals received from computing system 600 via the I/O port 608 into signals that may be sensed as output by a human, such as sound, light, and/or touch. The input device may be an alphanumeric input device, including alphanumeric and other keys for communicating information and/or command selections to the processor 602 via the I/O port 608. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 600 via the I/O port 608. For example, an electrical signal generated within the computing system 600 may be converted to another type of signal, and/or vice-versa. In one implementation, the environment transducer devices sense characteristics or aspects of an environment local to or remote from the computing device 600, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 600, such as, physical movement of some object (e.g., a mechanical actuator), heating or cooling of a substance, adding a chemical substance, and/or the like.

In one implementation, a communication port 610 is connected to a network by way of which the computer system 600 may receive network data useful in executing the methods and systems set out herein as well as transmitting information and network configuration changes determined thereby. Stated differently, the communication port 610 connects the computer system 600 to one or more communication interface devices configured to transmit and/or receive information between the computing system 600 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 610 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 610 may communicate with an antenna or other link for electromagnetic signal transmission and/or reception.

In an example implementation, sensor data, performance predictions, comparative values, control analytics, and software and other modules and services may be embodied by instructions stored on the data storage devices 604 and/or the memory devices 606 and executed by the processor 602. The computer system 600 may be integrated with or otherwise form part of the cooling system 100.

The system set forth in FIG. 7 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium; read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for evaporative cooling control, the method comprising:
   receiving a setpoint for a supply air for a designated space, the setpoint comprising a target temperature and a target dewpoint for the designated space;
   receiving at least one atmospheric condition of ambient air, the at least one atmospheric condition measured using one or more ambient air sensors;
   providing a cooling unit comprising an evaporative cooler and a mechanical cooling unit provided in series;
   generating a performance prediction of the evaporative cooler by calculating a set of one or more predicted psychrometric properties of ambient air that has been evaporatively cooled by the evaporative cooler based on the at least one atmospheric condition, the evaporative cooler having evaporative media and a pump;
   comparing the setpoint to the set of one or more predicted psychrometric properties of the performance prediction to result in a setpoint comparison, wherein the setpoint comparison consists of comparing temperature and dewpoint data;
   based on the setpoint comparison indicating that the target temperature and the target dewpoint cannot be maintained solely by the evaporative cooler, cooling the ambient air with the evaporative cooler and the mechanical cooling unit;
   based on the setpoint comparison indicating that the target temperature or dewpoint will be exceeded in at least one of ambient air that has been evaporatively cooled and the designated space, establishing dewpoint as a high limit and comparing the ambient air that has been evaporatively cooled with a return air in an energy comparison;
   controlling a flow of fluid over the evaporative media using the pump of the evaporative cooler based on the setpoint comparison;
   modulating the pump to control a flow of fluid over the evaporative media and to control an evaporation rate of water into air by at least one of pulsing the pump between an on and off status, controlling a pump speed, and modulating a valve to maintain a temperature and a dewpoint within the designated space at the target temperature and the target dewpoint; and
   providing an ambient air damper and a return damper wherein the ambient air damper is provided in coordination with the return damper and wherein the return damper and the ambient air damper are operable to mix return air with ambient air and deliver mixed air to the cooling unit, and an exhaust fan to output the return air; and
   when the energy comparison indicates that cooling the ambient air with the evaporative cooler to the setpoint is less energy intensive than directing return air to the cooling unit to reach the setpoint, opening the ambient air damper to a maximum setpoint, closing the return air damper, and modulating the cooling unit to reach the setpoint by evaporatively and mechanically cooling solely ambient air to provide cooled air to the designated space.

2. The method of claim 1, wherein the at least one atmospheric condition includes one or more of temperature, relative humidity, and airflow.

3. The method of claim 1, further comprising:
   validating the one or more predicted psychrometric properties of the performance prediction by measuring corresponding values of the supply air using one or more supply air sensors.

4. The method of claim 1, wherein the humidity setpoint includes at least one of a dewpoint setpoint, a relative humidity setpoint, an absolute humidity setpoint, or a humidity ratio setpoint.

5. The method of claim 1, wherein a flow of fluid in the evaporative cooler is controlled such that air exiting the evaporative cooler comprises a dewpoint equal to a dewpoint of at least one of: air leaving a cooling coil of the mechanical cooling unit, a supply air, and a dewpoint setpoint of a space without the requirement to dehumidify or reheat the air.

6. A method for evaporative cooling control, the method comprising:
   providing a cooling system in fluidic communication with a designated interior space, the cooling system comprising:
      (i) a cooling unit comprising an evaporative cooler and a mechanical cooling unit;
      ii) an ambient damper and a return damper, wherein the ambient damper and the return damper are provided in coordination with one another;
      (iii) an ambient air sensor; and
      (iv) a space sensor;
   wherein the ambient damper and the return damper are provided upstream of the cooling unit such that the cooling system is operable to mix air from the ambient damper and the return damper to form an intake air for the cooling unit;
   receiving a setpoint for the designated interior space, the setpoint consisting of a target temperature and a target dewpoint for the designated interior space;
   receiving at least one of a temperature and a dewpoint of ambient air from the ambient air sensor;

generating a performance prediction of the evaporative cooler by calculating a set of one or more predicted psychrometric properties of a supply air exiting the cooling unit based on the at least one atmospheric condition and a cooling capacity of the evaporative cooler, the evaporative cooler having evaporative media and a pump;

comparing the setpoint to the set of one or more predicted psychrometric properties of the performance prediction to result in a setpoint comparison consisting of temperature and dewpoint data; and based on the setpoint comparison indicating that a target dewpoint will be exceeded in at least one of the supply air exiting the evaporative cooler and the designated interior space, performing an energy comparison wherein energy required to meet the setpoint using evaporatively cooled ambient air is compared with energy required to meet the setpoint using return air;

when the energy comparison indicates that meeting the setpoint using evaporatively cooled ambient air is more energy intensive than directing return air to the cooling unit to reach the setpoint, closing the ambient air damper to a minimum ventilation setpoint, opening the return damper and modulating the cooling unit to reach the setpoint by evaporatively and mechanically cooling a mixture of return air and a minimal amount of ambient air.

7. The method of claim 6, wherein a flow of fluid in the evaporative cooler is controlled such that air exiting the evaporative cooler comprises a dewpoint equal to a dewpoint of at least one of: air leaving a cooling coil of the mechanical cooling unit, a supply air, and a dewpoint setpoint of a space without the requirement to dehumidify or reheat the air.

8. The method of claim 6, wherein the ambient damper is provided in coordination with the return damper to control a mixing of return air and ambient and form an intake air for the cooling unit.

* * * * *